(No Model.) 2 Sheets—Sheet 2.
P. MILES.
PROCESS OF MAKING FENCING.
No. 462,500. Patented Nov. 3, 1891.
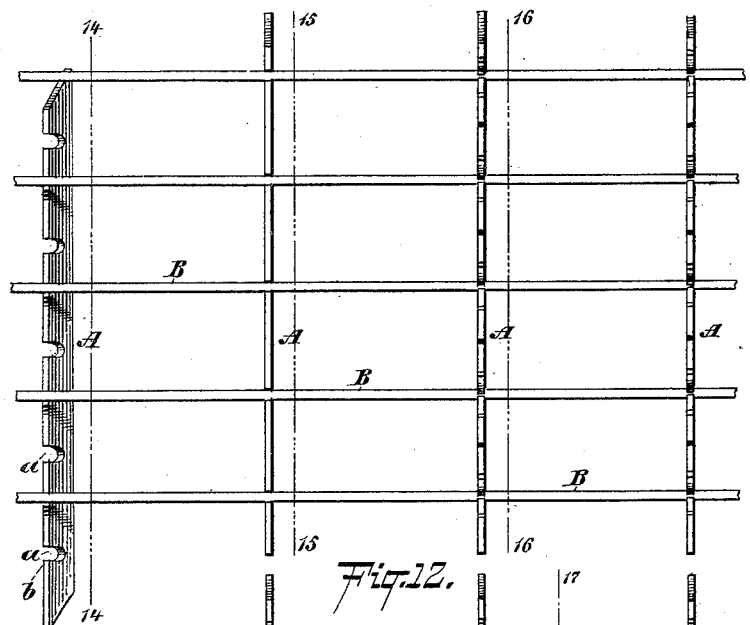
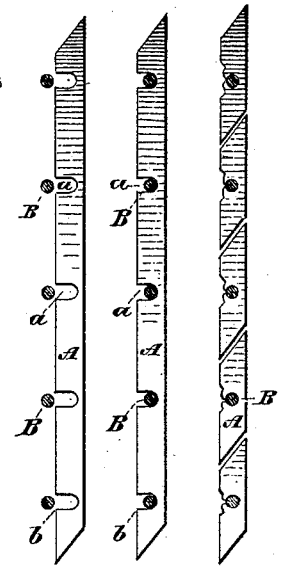
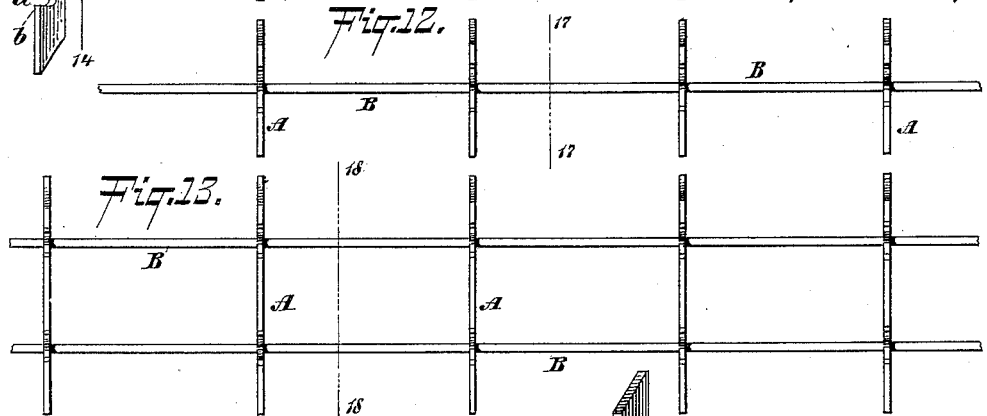
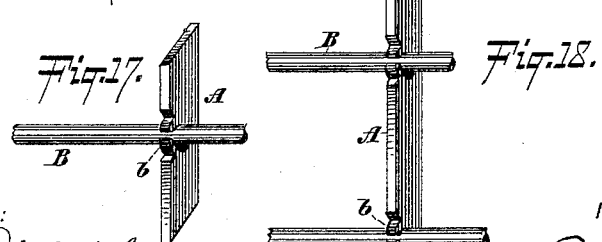
WITNESSES:
Gustave Dieterich.
Aug. Dieterich.
INVENTOR
Purches Miles
BY T. F. Bourne
his ATTORNEY.

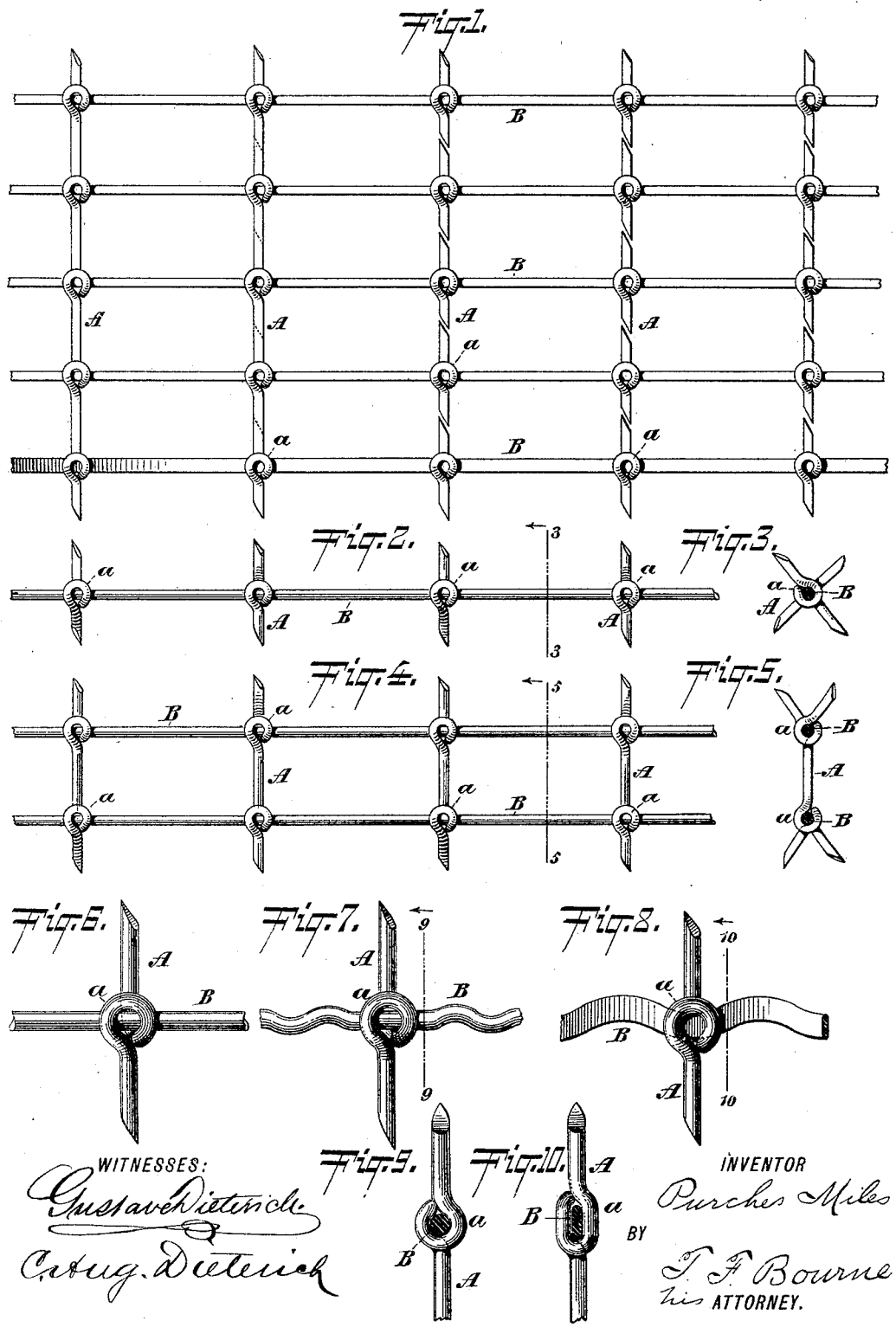

United States Patent Office.

PURCHES MILES, OF BROOKLYN, NEW YORK.

PROCESS OF MAKING FENCING.

SPECIFICATION forming part of Letters Patent No. 462,500, dated November 3, 1891.

Application filed November 13, 1890. Serial No. 371,280. (No model.)

*To all whom it may concern:*

Be it known that I, PURCHES MILES, a resident of Brooklyn, Kings county, New York, have invented an Improved Process of Making Fencing, of which the following is a specification.

The object of my invention is to produce a metallic fence having cross-bars or pickets, and with such speed as to obtain a great quantity of fence with a minimum expenditure of time and labor, whereby fencing will be greatly reduced in cost.

The invention consists in the novel details of improvement that will be more fully hereinafter set forth, and then pointed out in the claims.

Reference is to be had to the accompanying drawings, forming part hereof, wherein—

Figure 1 is a side elevation of the fence, showing different steps in its construction. Fig. 2 is a detail of a single strand complete. Fig. 3 is a cross-section on the plane of the line 3 3, Fig. 2. Fig. 4 is a detail showing two strands connected. Fig. 5 is a cross-section on the line 5 5, Fig. 4. Figs. 6, 7, 8, 9, and 10 are detail views hereinafter more fully explained. Fig. 11 is a view similar to Fig. 1, but showing a different mode of connecting the cross-bars to the longitudinal wires. Fig. 12 is a detail view of a single strand shown in Fig. 11. Fig. 13 is a detail view showing two strands connected as in Fig. 11. Figs. 14, 15, and 16 are cross-sectional views on the lines 14, 15, and 16, respectively, in Fig. 11, showing different steps in the process of making my fence. Fig. 17 is a perspective view of a cross-section on the line 17 in Fig. 12; and Fig. 18 is a perspective view of a cross-section on the line 18 in Fig. 13.

In carrying out my process I prepare cross bars or wires A with a series of suitable sockets or other holding means $a$, then place a series of longitudinal wires or rods B in said sockets or holding means and connect the cross-bars A to the wires or rods B by turning the metal of the cross-bar over or upon the longitudinal wires, as shown at the left in Fig. 1, and then sever the cross-bars A between the wires or rods B, as shown at the right in Figs. 1 and 11. The longitudinal wires B will then have secured to them cross-bars, pickets, or barbs, as clearly shown in Figs. 2 and 12. I may sever the cross-bars A between each two wires B to form a single strand of completed fence, as in Figs. 2 and 12, or between any two alternate wires B, to form a strand having two parallel wires connected by cross-bars A, as in Figs. 4 and 13, or I can sever the cross-bars A between any two wires B to form fencing having any desired number of longitudinal wires B, connected by cross-rods A.

In making the fence shown in Sheet 1 the longitudinal wires or rods B, which may be round, flat, crimped, or of any desired shape, are placed substantially parallel and at any desired distance apart, and are adapted to be moved longitudinally step by step. The cross-bars A (shown on Sheet 1) are then formed with sockets $a$, that are adapted to receive and embrace the wires or rods B, and with a number of sockets corresponding to the number of wires B, there being one socket $a$ on each cross bar A for each wire or rod B. These sockets, as shown on Sheet 1, are formed by bending up the cross-bar into loops or the like. The cross-bar A thus prepared is passed under or over the wires or rods B, which latter then pass into the sockets $a$. The cross-bars A and longitudinal wire B are then connected together by pressing the metal of the cross-bar over or upon the wires B, as shown in Fig. 3. The longitudinal wires B are now all connected together by the cross-rods A. The cross-rods A are then severed between the longitudinal wires B, leaving pickets, barbs, or the like secured to the wires B, whereby a number of strands of fence are produced at once. The sockets $a$ on the cross-bars B can all be made at once, the wires B and bars A all secured together at once and in any suitable quantity, and the cross-bars A be all severed at once, whereby a large number of strands of completed fence are made nearly as quickly as one strand could be. Suitable machinery can be used for forming all the sockets $a$ on a cross-bar A and for securing A and B together at one blow or motion and then severing A in the different places at one blow or motion to produce a great quantity of fence-strands at one operation, in contradistinction to forming one strand at a time.

The finished pickets or barbs can all project from the wire B parallel with each other, or they can be turned or bent in opposite directions, as shown in Figs. 3 and 5. The metal of the cross-bar can be pressed down so tight as to keep the picket or barb from turning on its wire B, (see Fig. 6,) or the picket or barb can be left free to turn on its wire B. (See Figs. 7 and 9.) In the latter case I prefer to crimp or corrugate the wire B, as in Fig. 7, to prevent the picket or barb from sliding longitudinally on the wire B. This crimping can be done either before or after the picket or barb is applied to the wire B. The metal of the cross-bar can also be folded over a flat wire or rod B, as in Fig. 10, and the latter can be crimped, as in Fig. 8. The projecting ends of the pickets or barbs can be pointed, as shown, or otherwise shaped, and this can be done by the cutter that severs the cross-bar A between the wires B.

I do not confine myself to forming the sockets $a$ to connect the cross-bars A to the wires B, as shown on Sheet 1. In Figs. 11 to 18 I have shown another means of connecting A and B, which for some reasons I prefer. Said means is as follows: The cross-bar A has a series of sockets, grooves, or the like $a$ cut into it, one for each longitudinal wire B. These bars A are first prepared with said sockets, are then passed under or over the longitudinal wires B, as at the left in Fig. 11. Said sockets $a$ are then brought in line with the wires B. (See Fig. 14). The wires B are then pressed into the sockets $a$, Fig. 15, and the edge or edges $b$ or the metal of the cross-bar at the sockets are then swaged or turned over or against the wires B, (see Figs. 16, 17, and 18,) which confines the wires or rods B in the sockets $a$, and thereby firmly secures the cross-bar to the longitudinal wires. The cross-bar A is then severed between any two wires B, as before specified, to produce single strands, or strands having a number of wires B. In this case the bars and rods A B can be either flat, round, or of other shape desired.

It will be understood that by preference after a cross-bar A has been secured to the longitudinal wires B, said bar and the wires B are moved forward one step and a new cross-bar secured to the wires B, while at the same time the first-mentioned cross-bar is severed between the wires B, and so on continuously, the cross-bars A being secured to the wires B, passed forward with the wires, and then severed one after another, while the completed strands are drawn away and can be wound on reels ready for transportation. If desired, as many as twenty or more wires B can be provided with barbs or pickets at one operation in a suitable machine. By this means the cost of making fence is reduced materially, because my process can be carried out in one machine with one or two attendants to produce a quantity of strands at once instead of using a separate machine for each strand of fence produced. The process can be carried out with great speed, as the cross-bars can be fed to the longitudinal wires very rapidly.

A fence constructed as hereinbefore specified will be strong and durable, visible, effective, and cheap.

By pressing the metal of the cross-bar over or upon the longitudinal wires, either in the form of the loop or by swaging the metal over, a very strong connection is made between the wire and picket or barb.

Having now described my invention, what I claim is—

1. The process of making fencing, consisting in forming a series of grooves or sockets in a cross-bar to receive longitudinal wires, then placing said wires in said grooves or sockets, then turning or swaging the metal of the cross-bar over or upon said wires to secure said wires to said cross-bar, and then severing said cross-bar between said wires, substantially as described.

2. The process of making fencing, consisting in forming a series of grooves or sockets in a cross-bar, then passing said cross-bar across said wires and bringing said grooves or sockets in position to receive said wires, then pressing said wires into said grooves or sockets, then turning or swaging the metal of said cross-bar over or upon said wires, and in then severing said cross-bar between said wires to produce separate strands of fencing, substantially as described.

PURCHES MILES.

Witnesses:
T. F. BOURNE,
C. R. BOURNE.